United States Patent
Stemmle et al.

(10) Patent No.: US 10,133,242 B2
(45) Date of Patent: Nov. 20, 2018

(54) METHOD OF TRANSMITTING ELECTRICAL ENERGY

(71) Applicant: NEXANS, Paris (FR)

(72) Inventors: Mark Stemmle, Hannover (DE); Beate West, Hannover (DE)

(73) Assignee: NEXANS, Courbevoie (FR)

( * ) Notice: Subject to any disclaimer, the term of this patent is extended or adjusted under 35 U.S.C. 154(b) by 88 days.

(21) Appl. No.: 14/755,051

(22) Filed: Jun. 30, 2015

(65) Prior Publication Data

US 2016/0026159 A1     Jan. 28, 2016

(30) Foreign Application Priority Data

Jul. 22, 2014   (EP) .................................... 14306185

(51) Int. Cl.
    *H01H 35/00*         (2006.01)
    *H01H 83/00*         (2006.01)
    (Continued)

(52) U.S. Cl.
    CPC ................ *G05B 9/02* (2013.01); *H01B 12/02* (2013.01); *H02H 7/267* (2013.01); *H02J 3/04* (2013.01);
    (Continued)

(58) Field of Classification Search
    CPC .......... H02H 3/025; H02H 7/267; G05B 9/02; H01B 12/02; H02J 3/04; Y02E 40/68; Y02E 40/60
See application file for complete search history.

(56) References Cited

U.S. PATENT DOCUMENTS

| 3,925,707 A | * | 12/1975 | Bhate | H02H 3/025 |
| | | | | 361/19 |
| 5,218,505 A | * | 6/1993 | Kubo | H01F 6/006 |
| | | | | 361/11 |

(Continued)

OTHER PUBLICATIONS

Jun Yang "Development of a New protection device for High Temperature Superconducting Power Cable".*

(Continued)

*Primary Examiner* — Rexford Barnie
*Assistant Examiner* — Rasem Mourad
(74) *Attorney, Agent, or Firm* — Sofer & Haroun, LLP

(57) ABSTRACT

A method for transmitting electrical energy is proposed in which between two electrical units electrical current is transmitted by means of a superconductive cable system (4). The two ends of the superconductive cable system (4) are each connected in a current conducting manner to one of the electrical units. A normally conductive cable system. (5) is arranged parallel to the superconductive cable system (4). The function of the superconductive cable system (4) is monitored by a control unit (10). During normal operation. only one end of the normally conductive cable system (5) is connected in a voltage conducting manner to one of the electrical units. In case of a malfunction of the superconductive cable system (4), a first signal (12) of the control unit (10) initially connects the other end of the normally conductive cable system (5) to the other electrical unit, so that the normally conductive cable system (5) becomes current conducting, and the superconductive cable system (4) is subsequently switched off by at least one of the electrical units.

1 Claim, 2 Drawing Sheets

(51) Int. Cl.
    *G05B 9/02*     (2006.01)
    *H02H 7/26*     (2006.01)
    *H01B 12/02*     (2006.01)
    *H02J 3/04*     (2006.01)
    *H02H 7/00*     (2006.01)

(52) U.S. Cl.
    CPC .............. *H02H 7/001* (2013.01); *Y02E 40/60* (2013.01); *Y02E 40/68* (2013.01)

(56) References Cited

U.S. PATENT DOCUMENTS

| | | | |
|---|---|---|---|
| 2007/0139832 A1* | 6/2007 | Lee ........................ | H02H 3/025 361/19 |
| 2008/0043382 A1* | 2/2008 | Lee ........................ | H02H 7/001 361/19 |
| 2008/0191561 A1 | 8/2008 | Folts et al. | |
| 2012/0095707 A1* | 4/2012 | Li ........................ | G01R 31/085 702/58 |
| 2016/0013635 A1* | 1/2016 | Isojima .................. | H02H 9/023 505/211 |

OTHER PUBLICATIONS

Yang et al.: "Development of a new protection device for high temperature superconducting power cable" (Jul. 20, 2008).
Maguire et al.: "Development and demonstration of a fault current limiting HTS cable to be installed in the con Edison grid" (Jun. 1, 2009).
Search Report dated 2014.

* cited by examiner

METHOD OF TRANSMITTING ELECTRICAL ENERGY

RELATED APPLICATION

This application claims the benefit of priority from European Patent Application No. 14 306 185.1, filed on Jul. 22, 2015, the entirety of which is incorporated by reference.

BACKGROUND

1. Field of the Invention

The invention relates to a method for transmitting electrical energy, in which between two electrical units, electrical current is transmitted by means of a superconductive cable system whose two ends are each connected in a current conducting manner to one of the electrical units, and in which, further, a normally conducting cable system is arranged parallel to the superconductive cable system, wherein the function of the superconductive cable system is monitored. by a control unit.

2. Description of Related Art

Superconductive cable systems are used, for example, for transmitting electrical energy in municipal current supply networks. At sufficiently low temperatures, at which the direct current of the conductor is zero, they permit the virtual loss-free transmission of electrical energy. For example, a superconductive cable system can be used in regional transport or distribution networks (for example at a voltage of 110 kV), or for connecting transformer units within an inner city distribution network (for example at a voltage of 10 kV). A superconductive cable system can also connect the connector of a user to a municipal power network.

The superconductive cable system consists of a superconductive cable which is arranged in a cryostat for cooling. The cryostat has at least one thermally insulated pipe through which a suitable cooling agent, for example, liquid helium or liquid nitrogen, is conducted. The insulated pipe consists, for example, of two concentrically arranged metal pipes held at a distance from each other and include a vacuum insulation and other insulation materials between them. At the ends of the superconductive cable system, end closures for connection to a current supply network or electrical units are secured. These end pieces are equipped with access for feeding the cooling agent from a cooling agent reservoir. The ends of the superconductive cable system are each connected by means of power switches and other cable elements, for example, separating switches to collection rails between the transformer units or other electrical units.

The technical components of the electrical units, as well as the electrical lines between the units, are usually designed so as to be redundant so that in the case of a problem, i.e. a failure or error of one of the components, the function of the energy transmission system continues to be ensured and, for example, a current failure is avoided. In addition to the superconductive cable system, a conventional, i.e. normally conductive cable system which also is connected by means of power switches and other elements to the transformer units. The normally conductive cable system normally comprises, for example, one or more conventional cables per phase in a three phase system. During normal operation, the superconductive cable system and the normally conductive cable system can be operated so that, in case of interruption of the one cable system, the respectively other cable system can continue to operate. Alternatively, the normally conductive cable system can be switched off during normal operation.

The function of the superconductive cable system is monitored by a control or protective system. For example, the protective system measures the strength of the current or the impedance at one or both ends of the superconductive cable system. If a defective function is determined, the superconductive cable system is switched off. If the normally conductive cable system is not operated parallel to the superconductive system, the one is subsequently switched to the other. In the case of the normally conductive cable system, operated in parallel, it is a disadvantage that current always flows through the cable system and causes losses which increase the total system losses. The service life of the normally conductive cable system is decreased by being permanently switched on.

In the case of a normally conductive cable system, there is the disadvantage that the current supply of the network is not ensured after the superconductive cable system has been switched off and before the normally conductive cable system is switched on. In Jun Yang et al, Power and Energy Society General Meeting —Conversion and Delivery of Electrical Energy in the $21^{st}$ Century, 2008 IEEE, 20 Jul. 2008, p. 1-5, a high temperature superconductive (HTS) cable system is described, which includes an HTS cable and a parallel conventional cable. A conventional cable is switched off, in the case of failure of the HTS cable, and the HTS system is switched off immediately subsequently.

OBJECTS AND SUMMARY

The invention is based on the object of making available an improved method for transmitting electrical energy by means of a superconductive cable system, wherein an interruption of the supply is avoided.

This object is met in accordance with the invention in that during normal operation only one end of the normally conductive cable system is connected, in that in the case of problems caused by the first signal in the superconductive cable system, initially the other end of the normally conductive cable system is conductively connected so that the normally conductive cable system becomes current conducting, and in that the superconductive cable system is subsequently switched off by a second signal of the control unit of at least one of the electrical units.

The method according to the invention permits an efficient utilization of a transmission system for electrical energy within a current network. Permanently switching on of the normally conductive cable system at one end thereof permits especially the monitoring of the problem free function of the cable system. Therefore, the functional safety of the total system is increased relative to the known systems and the corresponding methods for electrical energy transmission. During normal operation, the normally conductive cable system is only loaded by loading currents. Since this does not result in significant currents, only low negligible losses occur as a result of the current load. This substantially lowers the total losses of the transmission. Also, the service life of the normally conductive cable system is increased. The switching sequence of the transmission system regulated by the control unit ensures that the connected electrical units, for example transformer units, are supplied without interruption. The normally conductive cable system is, in the case of an interruption of the superconductive cable system, always switched on prior to the switching off of the superconductive cable system. This is achieved by the corresponding delay between the sending of the first, signal and sending of the second signal. The control unit can send, for example initially, the first and then the second signal with time delay to the corresponding power switches. Alternatively, a switching sequence which contains both signals can also be sent once to the power switches, wherein the second signal is associated with a corresponding delay.

BRIEF DESCRIPTION OF THE DRAWINGS

The method according to the invention, as well as a corresponding transmission system, are explained with the aid of the drawings. In the drawings.

DETAILED DESCRIPTION

Figure 1:
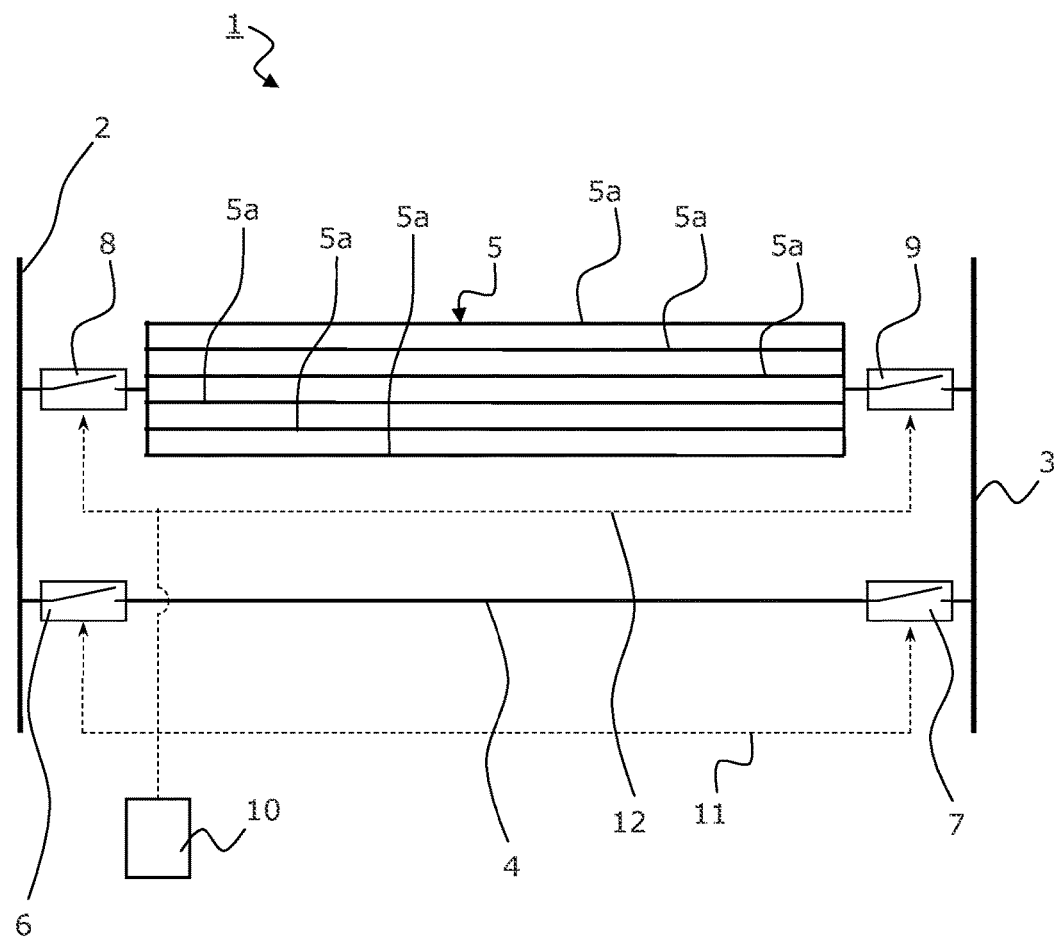
FIG. 1 is a schematic view of a system for transmitting electrical energy.

In FIG. 1, two connecting elements 2, 3 of an electrical plant, between which electrical energy is to be transmitted, is shown. The connecting elements 2, 3 can be, for example, connecting rails of a three phase current system which belongs in a transformer unit. Superconductive cable system 4 connects the connecting elements 2, 3 to each other. The superconductive cable system 4 is, at its ends, connected by means of a power switch 6, 7 to a connecting element 2, 3.

Parallel to the superconductive cable system 4 a normally conductive cable system 5 is at its ends connected by means of power switches 8, 9 to one of the connecting elements 2, 3. The normally conductive cable system comprises at least one normally conductive cable 5a per phase, preferably however, several normally conductive cables 5a per phase. In FIG. 1 two cables 5a per phase are illustrated.

In normal operation, i.e. in operation which is in accordance with the correct operation of the transmission system 1, only the superconductive cable system 4 serves for conducting current for energy transmission. The normally conductive cable system 5 does not transmit current. The power switches 6, 7, which belong to the superconductive cable system 4, are closed. The normally conductive cable system 5 is constructed as a redundant system in case that a problem occurs in the superconductive cable system 4. Normally conductive cable system 5 is only connected to an end of one of the connecting elements 2, 3. Thus, a current conducting connection is created between one of the electrical units and the normally conductive cable system, but no current conducting connection is effected between the two electrical units.

A control unit 10 monitors the function of the superconductive cable system 4 and the normally conductive cable system 5. The control unit 10 is a protective system which advantageously carries out continuous measurements of one or more of the physical values current, voltage, and impedance at the cable systems 4, 5. The measurements can also be carried out in regular intervals. The control unit 10 is suitable for closing and opening the power switches 6-9 by means of signals.

Control unit 10 may consist of a component as illustrated in FIG. 1. In that case, the control unit 10 is connected communicatively to each of the power switches 6-9. The control unit 10 can alternatively consist of two parts, wherein each one is always communicatively connected to one of the electrical units. In that case, a part of the control unit 10 is always communicatively connected to one of the power switches 6-9 of the electrical units. Parts of the control unit 10, in turn, can also be connected communicatively to each other. The control unit 10 may also consist of several parts, one of which is connected to one of the power switches.

In accordance with an alternative embodiment, the superconductive cable system 4 and the normally conductive cable system 5 can also be monitored by a corresponding protective system. These two protective systems are in this case communicatively connected to each other to form a control unit.

During operation of the energy transmission system 1, the function or the problem free operation of the superconductive cable system 4 is monitored by a control unit 10 by, for example, measuring the current at both ends of the superconductive cable system 4 and comparing their values (differential protection). In case of a difference, an error of indication is triggered. The current can also be measured at only one end of the superconductive cable system 4 in order to determine whether its value is too high or correct. Function of the normally conductive system 5 is monitored by measuring the voltage at the one connected end of the normally conductive system 5. In this manner, it can be determined whether one of the cables is, for example, torn or otherwise damaged by a street construction device.

Figure 2:
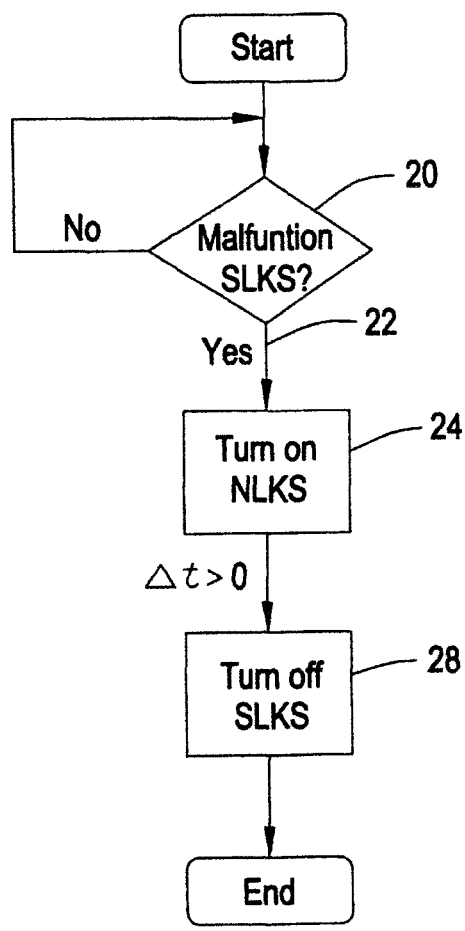
FIG. 2 shows an embodiment of a method for transmitting electrical energy.

An embodiment of the method according to the invention is illustrated in FIG. 2 schematically as a flow chart. The method is carried out by means of transmission system 1, illustrated in FIG. 1. The operation of the superconductive cable system (SLKS) is monitored by the control unit 10 (Reference Numeral 20). If a malfunction or a problem is detected (Reference Numeral 22), this must be quickly separated from the network. The control unit 10 generates a first signal 12 (Reference Numeral 24), by means of which the second of the power switches 8, 9 (LS) for connecting the normally conductive system 5 (NLKS) is closed. The connection between the electrical units through the normally conductive cable system 5 is current conducting after closing the second power switch 8, 9. After sending the first signal (Reference Numeral 24) by means of a second corresponding signal 11 (Reference Numeral 28) at least one of the power switches 6, 7, by means of which the superconductive system 4 is connected to one of the electrical units, is opened so that the same is switched off by means of one of the electrical units. There is now no longer a current conducting connection through the superconductive cable system 4.

Preferably, both power switches 6, 7 of the superconductive cable system 4 are opened.

Since the superconductive cable system 4 has to switch off in case of a malfunction as quickly as possible, the described switching sequence must take place in rapid time. The time interval ($\Delta t$) between switching off of the superconductive cable system 4 and switching on of the normally conductive cable system 5 is only a few milliseconds. For example, the signal 11 for switching off of the superconductive cable system 4 takes place 1-20 ms after the signal 12 for switching on the normally conductive system 5. This can be achieved in that the second signal 11 sent at an appropriate time interval after sending the first signal 12. If the malfunction concerns the normally conductive system 5, a signal generated by the control unit of the power switch 8, 9, by means of which the normally conductive system 5 is connected to the electrical units, is opened. The normally conductive cable system 5 is now completely switched off and can be repaired in order to correct the malfunction.

The invention claimed is:

1. Method for transmitting electrical energy between two electrical units by which electrical current is transmitted between electrical units over either one of a superconductive cable system, the two ends of which are each connected in a current conducting manner to the two electrical units, or a normally conductive cable system that is arranged parallel to the superconductive cable system, said method comprising the steps of:

arranging two superconductor switches, one at either end of said superconductive cable system, each between said superconductive cable system and said electrical units, arranging two normal switches, one at either end of said normally conductive cable system, each between said normally conductive cable system and said electrical units, wherein the function of the superconductive cable system is monitored by a control unit in either one of the electrical units said control unit connected to said two superconductor switches and said two normal switches, and configured to arrange opening and closing of said switches via control signals, wherein during normal operation, both switches of said superconductive cable system and only, at most, one switch of said normally conductive cable system are connected to said electrical units such that superconductive cable system is the only active conducting system between said electrical units during said normal operation;

wherein in the case of a malfunction of the superconductive cable system detected by said control unit, a first signal of the control unit initially connects at least one or two switches at the ends of said normally conductive cable system to the electrical units, so that the normally conductive cable system becomes conducting between said two electrical units; and the superconductive cable system is subsequently switched off by a second signal from the control unit by opening one or two of said switches between said electrical units and said superconductive cable system, wherein the first and second signals of the control unit are sent at a time interval of 1 ms to 20 ms.

* * * * *